June 3, 1930.  F. E. TOWER  1,761,096
TRIMMING MACHINE
Filed May 21, 1928   2 Sheets-Sheet 2
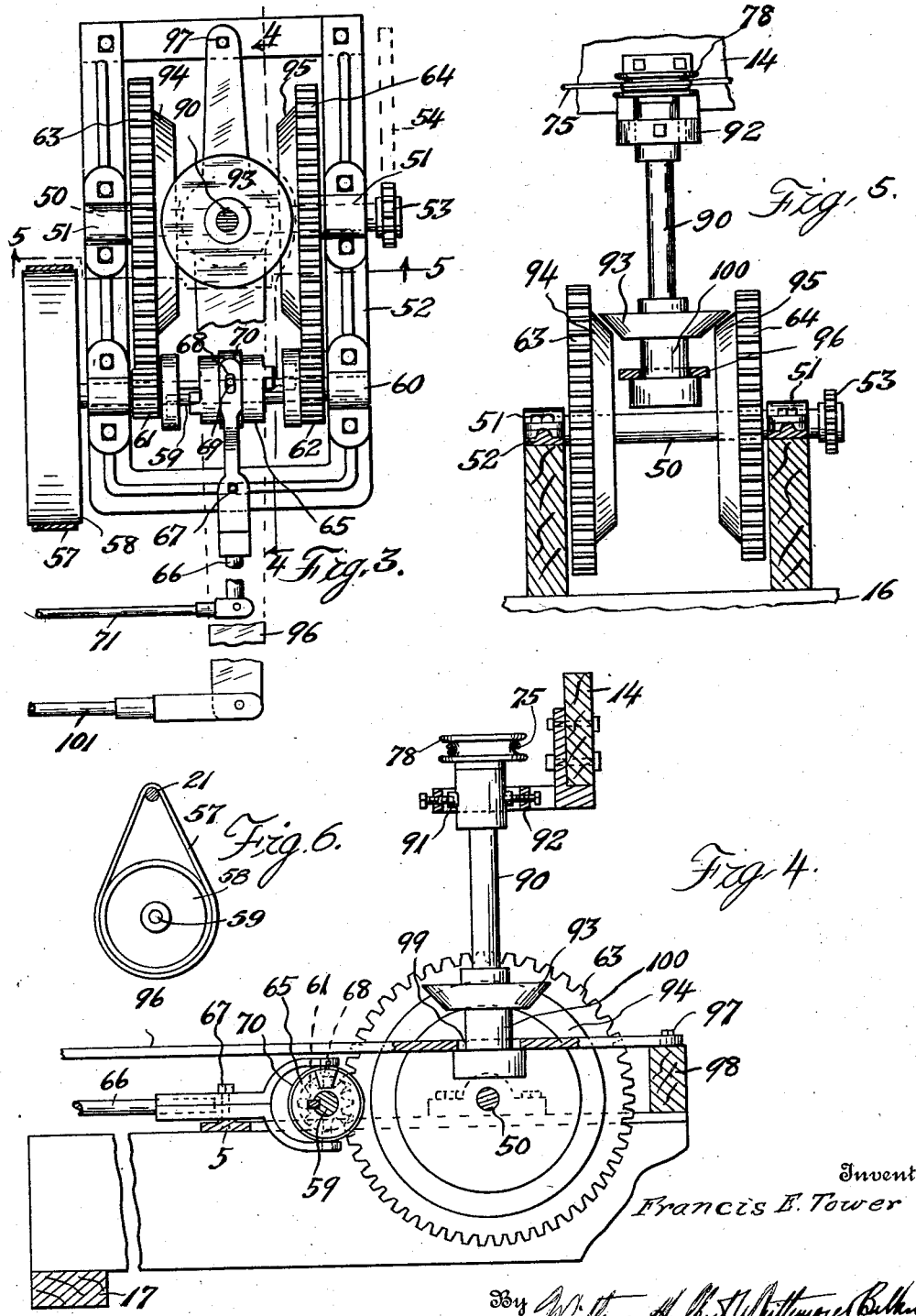

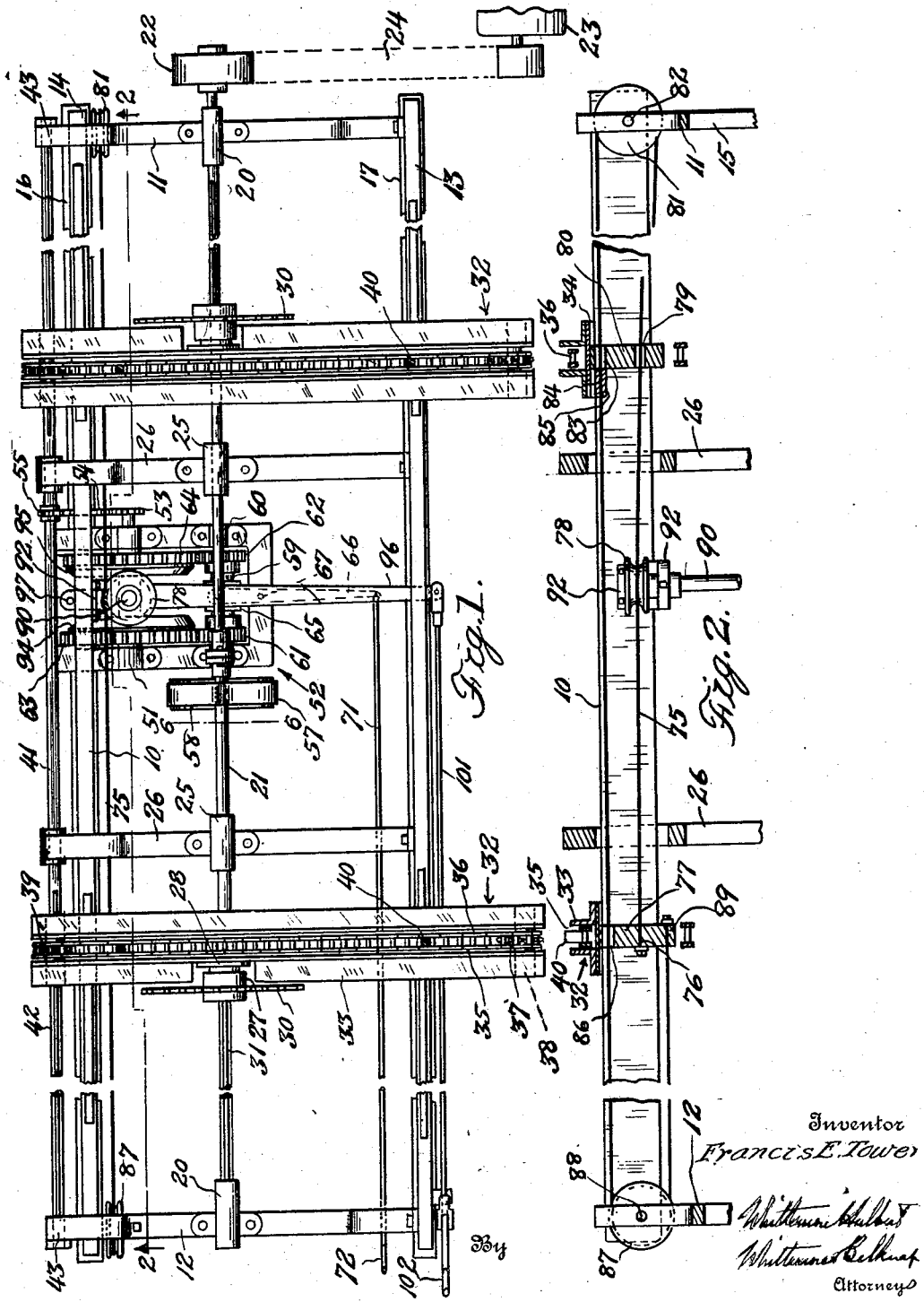

Patented June 3, 1930

1,761,096

UNITED STATES PATENT OFFICE

FRANCIS E. TOWER, OF GREENVILLE, MICHIGAN, ASSIGNOR TO GORDON HOLLOW BLAST & GRATE COMPANY, OF GREENVILLE, MICHIGAN, A CORPORATION OF MICHIGAN

TRIMMING MACHINE

Application filed May 21, 1928. Serial No. 279,553.

This invention relates to trimming machines and has particular reference to a machine for trimming the ends of boards and the like.

An object of this invention is to provide a trimming machine having an adjustable saw and having means for quickly and accurately adjusting the saw to a predetermined desired position.

Another object of this invention is to provide a trimming machine having a saw adjusting mechanism adapted to be power actuated.

A further object of this invention is to provide a trimming machine having a plurality of saws and having means for simultaneously and equally adjusting all of the said saws.

Still another object of this invention is to provide a trimming machine having means for feeding the lumber to be trimmed, means for adjusting the saws and a common means for driving both of the said means.

Other objects and advantages of this invention will become apparent as the following description proceeds particularly when reference is had to the accompanying drawings wherein:

Figure 1 is a plan view of a machine constructed in accordance with the teaching of this invention;

Figure 2 is a section taken substantially on the line 2—2 of Figure 1;

Figure 3 is an enlarged plan view of a portion of the construction shown in Figure 1;

Figure 4 is a vertical sectional view taken substantially on the line 4—4 of Figure 3;

Figure 5 is a vertical sectional view taken substantially on the line 5—5 of Figure 3; and Figure 6 is a vertical sectional view taken on the line 6—6 of Figure 1.

Referring now particularly to the drawings wherein like reference characters designate corresponding parts throughout all views, 10 designates generally the main frame work of the machine, which frame work includes the end members 11 and 12 respectively and the upper front and rear longitudinally extending members 13 and 14 respectively. The end members 11 and 12 include the leg portions 15 to the base of which are secured longitudinally extending members 16 and 17 forming a base for the frame.

Mounted on the upper surfaces of the end members 11 and 12, are the bearings 20 adapted to support a main drive shaft 21 which extends longitudinally of the frame 10 and preferably substantially centrally thereof. The drive shaft 21 is provided at one end with a drive pulley 22 adapted to receive power from a suitable motor 23 by means of a drive belt 24. The shaft 21 may have bearing support as at 25 in intermediate cross members 26, which cross members serve to aid in supporting the boards to be trimmed in a manner hereinafter to be more fully described.

Mounted for longitudinal adjustment on the drive shaft 21 are a pair of circular saws 30. Each saw is formed integral with a sleeve 27 keyed to the drive shaft 21 as by a keyway 31 whereby each saw is supported by and will rotate with the drive shaft 21 but may be shifted longitudinally of this drive shaft for positioning longitudinally of the frame 10.

Fixed for longitudinal movement with each saw 30 is a transfer block designated generally by the reference character 32. Each transfer block is built-up from a pair of steel angle bars 33 secured to each other as by the plates 34 and each block is provided intermediate its ends with a bearing 28 in which one end of the sleeve 27 is journaled but in which the sleeve is locked against longitudinal movement. As clearly illustrated in Figures 1 and 2 of the drawing the angle bars 33 have their vertically extending legs arranged in spaced relation to each other to form a channel 35 adapted to receive a sprocket chain 36. Each sprocket chain 36 passes over a sprocket wheel 37 rotatably mounted on a shaft 38 arranged at the forward end of its respective transfer block and also passes over a drive sprocket wheel 39 arranged at the rear of each transfer block 32. Each sprocket chain 36 is provided with a plurality of lugs 40 adapted to engage the boards to be trimmed in a manner hereinafter to be more fully described.

Each sprocket wheel 39 is keyed to a shaft 41 as by a key-way 42 whereby the sprocket wheels 39 may be moved longitudinally of the shaft 41 but will rotate with this shaft. The shaft 41 is mounted in suitable bearings 43 arranged at the rear of the frame 10 and is adapted to be rotated by a suitable mechanism hereinafter to be described.

Obviously rotation of the shaft 41 effects a rotation of the sprocket wheels 39 which sprocket wheels in turn tend to draw the sprocket chains 36 transversely of the machine as will be readily apparent by reference to Figure 1 of the drawing. The sprocket chains 36 being provided with the lugs 40 act in the nature of conveyor chains to convey the pieces of lumber to be cut transversely of the machine and between the saws 30. The boards to be trimmed will be supported not only on the transfer blocks 32 but also on the cross members 26 during their travel across the frame. The boards will thus be solidly supported and their ends will be trimmed by the saws 30.

For rotating the shaft 41 there is provided a countershaft 50 mounted for rotation in suitable bearings 51 carried by a frame 52 extending inwardly from the lower rear longitudinally extending frame member 16. The countershaft 50 is provided at one end with a sprocket wheel 53 adapted to receive a suitable sprocket chain 54 which chain in turn engages a sprocket wheel 55 rigidly mounted on the shaft 41. Obviously rotation of the shaft 50 is imparted to the shaft 41 to drive the sprocket wheels 39.

For driving the shaft 50 from the main drive shaft 21 and for coupling the shaft 50 to the main drive shaft 21 at the will of the operator, there is provided the following structure. Engaging the drive shaft 21, is a belt 57 which belt is adapted to drive a pulley 58 mounted on a stub shaft 59 carried by the frame 52. As illustrated in Figure 3 of the drawing, the stub shaft 59 is supported in the bearings 60 in parallel spaced relation to the shaft 50.

Freely mounted on the stub shaft 59 are a pair of clutch pinion gears 61 and 62 respectively. These pinion gears are adapted to engage with driven gears 63 and 64 rigidly mounted on the shaft 50. A clutch member 65 is slidably keyed to the stub shaft 59 between the clutch pinions 61 and 62 and is adapted to be shifted to clutch either of the said clutch pinion gears to the shaft 59. As clearly illustrated, the gear 63 is larger than the gear 64 so that the shaft 50 will be driven at different speeds depending upon which of the clutch pinion gears is coupled to the shaft 59. For a low speed, the clutch pinion gear 61 is coupled to the shaft 59 whereupon the shaft 50 will be driven to drive the shaft 41 in the manner brought out before. For a higher speed the clutch member 65 is moved to the right to uncouple the clutch pinion 61 from the shaft 59 and to couple the clutch pinion 62 to the shaft 59.

For shifting the clutch member 65 there may be provided a lever 66 pivoted to the frame 52 as at 67 and provided with the slot 68 engaging a pin 69 carried by a collar 70 rotatably mounted on the clutch member 65. A link 71 may be secured to the opposite end of the lever 66 and may extend to one end of the frame 10 where it is connected to a handle 72 as clearly illustrated in Figure 1 of the drawing. Obviously actuation of the handle 72 tends to actuate the lever 66 to selectively couple either the clutch pinion 61 or the clutch pinion 62 to the shaft 59. When the clutch member 65 is in the position shown in Figure 3 of the drawing, the drive will be disconnected between the drive shaft 21 and the shaft 41 whereby the sprocket wheels 39 will be stationary.

The present invention relates particularly to means for adjusting the saws 30 and the transfer blocks 32 longitudinally of the frame 10 and for actuating this adjusting mechanism by the drive for the conveyor chains or feeding mechanism above described. Accordingly there is provided a flexible member or cable 75 having one end secured as at 76 to a block 77 secured to the plate 34 which secures the angle bars 33 of one transfer block together. From its point of attachment 76 the cable 75 is extended longitudinally of the frame 10 and is passed around a pulley 78 driven in a manner hereinafter to be more fully described. From the pulley 78 the cable 75 is extended longitudinally of the frame 10 through an aperture 79 formed in a block 80 carried by the other transfer block 32 and is then passed around a pulley 81 mounted for rotation on a shaft 82 carried by the end member 11. From the pulley 81 the cable 75 is extended backwardly longitudinally of the frame 10, through a second aperture 83 formed in the block 80 to a point 84 where it is clamped to the second mentioned transfer block 32 as by a plate 85. From the point 84 the cable 75 is extended longitudinally of the frame 10 through an aperture 86 formed in the block 77 around a pulley 87 mounted for rotation on a shaft 88 carried by the end member 12 and back to the block 77 where it is secured to this block as at 89. The free ends of the cable are thus secured to one of the transfer blocks 32 as by attachment to the block 77 and the cable is secured intermediate its ends to the other transfer block as at 84. Obviously longitudinal movement of the cable 75 in one direction will tend to move the saws 30 and the transfer blocks 32 away from each other, while longitudinal movement of the cable 75 in the other direction will tend to move the saws 30 and the transfer blocks 32 toward each other.

The cable 75 is moved longitudinally by rotation of the pulley 78 and for rotating this pulley from the drive for the feeding mechanism the following structure is provided. The pulley 78 is mounted on the upper end of a shaft 90 which shaft may be supported in a bearing 91 having rockable engagement with a bracket 92 carried by the longitudinal extending frame member 14. Adjacent the lower end of the shaft 90 there is mounted a conical friction member 93 adapted to be selectively engaged with conical friction surfaces 94 and 95 carried by the gears 63 and 64 respectively. Obviously rocking of the shaft 90 to cause the member 93 to engage the surfaces 94 or 95 will effect a rotation of the shaft 90 from the gears 63 or 64. Obviously also engagement of the member 93 with the surface 94 will effect a rotation of the shaft 90 in one direction, while engagement of the member 93 with the surface 95 will effect a rotation of the shaft 90 in the opposite direction.

For rocking the shaft 90 to cause the member 93 to engage the surfaces 94 or 95 there is provided a lever 96 pivoted as at 97 to a beam 98 carried by the frame 52. The lever 96 is provided intermediate its ends with a slot 99 adapted to surround the extension 100 of the shaft 90 whereby movement of the lever 96 about its pivot 97 will effect the desired rocking of the shaft 90.

As clearly illustrated in Figure 1 of the drawing the lever 96 may be extended to the front of the frame 10 for attachment to a link 101 which is extended to one end of the machine for attachment to a suitable handle 102 carried by the end member 12. Obviously movement of the handle 102 will effect a shifting of the lever 96 to engage the member 93 with either surface 94 or 95.

From the above, it is believed that the operation of the machine will be readily apparent. To space the saws 30 the desired distance apart, the shaft 90 is coupled to either the gear 63 or the gear 64 depending upon whether the saws 30 are to be moved toward or away from each other.

The drive through the shaft 90 and the cable 75 will be positive and will accurately and quickly adjust the saws 30 longitudinally of the frame 10 to the desired position. After the saws have been adjusted the boards to be trimmed are fed to the transfer blocks 32 where they will be caught by the lugs 40 on the chains 36 and carried transversely of the frame 10 between the saws 30. The saws 30 will accurately trim the ends of the boards and as brought out before may be adjusted quickly, simultaneously and accurately to vary at the will of the operator, the length of the boards being trimmed.

While one form of the inventive idea has been described with considerable detail, it is to be clearly understood that the description is for the purposes of illustration only and is not definitive of the limits of the invention. The right is therefore reserved to make such changes in the details of construction and arrangement of parts as will fall within the purview of the attached claims.

What I claim as my invention is:

1. In a trimming machine, a frame, a transfer block adapted for adjustment longitudinally of said frame, a saw movable with said transfer block, a main drive shaft for driving said saw, a sprocket chain carried by said transfer block, for feeding work to said saw, an auxiliary shaft for driving said sprocket chain, a clutch for coupling said main drive shaft to said auxiliary shaft, a flexible member for adjusting said transfer block, and means for driving said flexible member from said auxiliary shaft, said means including a shaft for driving said flexible member, and a friction clutch for coupling said last mentioned shaft to said auxiliary shaft.

2. In a trimming machine, a frame, a pair of transfer blocks adapted for adjustment longitudinally of said frame, a saw carried by each transfer block, a main drive shaft for driving said saws and means for adjusting said transfer blocks toward or away from each other, said means including a flexible member having its ends secured to one of the transfer blocks, the said flexible member being secured intermediate its ends to the other transfer block, pulleys for supporting said flexible member for movement longitudinally of the frame and means for driving said flexible member from said main drive shaft, said last mentioned means including a vertically suspended shaft, a pulley carried by said shaft, the said flexible member being wrapped around said pulley and means for driving said shaft from said main drive shaft.

3. In a trimming machine, a frame, a pair of transfer blocks adapted for adjustment longitudinally of said frame, a saw carried by each transfer block, a main drive shaft for driving said saws and means for adjusting said transfer blocks toward or away from each other, said means including a flexible member having its ends secured to one of the transfer blocks, the said flexible member being secured intermediate its ends to the other transfer block, pulleys for supporting said flexible member for movement longitudinally of the frame and means for driving said flexible member from said main drive shaft, said means including a stub shaft, means including gears carried by said stub shaft for coupling said stub shaft to said main drive shaft, a conical friction surface formed on each gear, a shaft connected to said flexible member, and a friction cone carried by said last mentioned shaft, said cone being selectively engageable with said conical friction surfaces.

4. In a trimming machine, a frame, a main shaft extending longitudinally of said frame, a pair of saws keyed to said shaft for longitudinal movement thereon, means for rotating said shaft to drive said saws, sprocket chains for feeding work to said saws, an auxiliary shaft for driving said sprocket chains, a driving connection between said main shaft and said auxiliary shaft for rotating the latter from the former, a flexible member connected to said saws for adjusting the same relative to each other, a pulley for actuating said flexible member, and means for connecting said pulley to the connection between said main shaft and said auxiliary shaft for driving said pulley from said connection.

In testimony whereof I affix my signature.

FRANCIS E. TOWER.